United States Patent
Tanaka

(10) Patent No.: US 9,602,693 B1
(45) Date of Patent: Mar. 21, 2017

(54) IMAGE PROCESSING SYSTEM AND METHOD FOR REMOVING DESIGNATED COLOR IN AN ORIGINAL DOCUMENT

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiromasa Tanaka, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/867,169

(22) Filed: Sep. 28, 2015

(51) Int. Cl.
| | |
|---|---|
| G03F 3/08 | (2006.01) |
| H04N 1/38 | (2006.01) |
| H04N 1/62 | (2006.01) |
| H04N 1/04 | (2006.01) |
| H04N 1/60 | (2006.01) |

(52) U.S. Cl.
CPC ............... *H04N 1/38* (2013.01); *H04N 1/04* (2013.01); *H04N 1/6019* (2013.01); *H04N 1/626* (2013.01)

(58) Field of Classification Search
None
See application file for complete search history.

(56) References Cited

U.S. PATENT DOCUMENTS

| | | | | |
|---|---|---|---|---|
| 5,055,886 | A * | 10/1991 | Nakatani ............... | G03G 15/01 347/119 |
| 6,823,081 | B2 | 11/2004 | Lee et al. | |
| 7,853,074 | B2 * | 12/2010 | Mischler ................. | H04N 1/38 235/454 |
| 7,860,310 | B2 * | 12/2010 | Yamamoto .............. | G06K 9/38 358/462 |
| 9,071,784 | B2 * | 6/2015 | Kim ......................... | H04N 1/38 |
| 2007/0196014 | A1 * | 8/2007 | Yamamoto .............. | G06K 9/38 382/169 |
| 2009/0097072 | A1 * | 4/2009 | Tamura .................. | G06T 11/001 358/3.01 |
| 2009/0109493 | A1 * | 4/2009 | Takahashi .......... | H04N 1/00846 358/3.28 |
| 2013/0021626 | A1 * | 1/2013 | Kim ........................ | H04N 1/38 358/1.9 |
| 2013/0235432 | A1 * | 9/2013 | Shokai ............... | H04N 1/00074 358/3.28 |
| 2015/0055864 | A1 * | 2/2015 | Hasegawa ............ | G06T 11/001 382/167 |
| 2015/0160592 | A1 | 6/2015 | Aoki | |

* cited by examiner

*Primary Examiner* — Dung Tran
(74) *Attorney, Agent, or Firm* — Amin, Turocy & Watson LLP; Gregory Turocy

(57) ABSTRACT

In accordance with an embodiment, an image processing apparatus comprises a scanner; a designation section configured to designate a color presented in an original document as the object to be removed; extraction section configured to extract color information of the color to be removed based on image data which is obtained by reading, using the scanner, a color information extraction sheet on which an image is formed with a material of the color to be removed; and a conversion section configured to form, based on the designation of the designation section and the color information extracted by the extraction section, an image by removing the image data in the color designated to be removed from the image data of the original document.

10 Claims, 14 Drawing Sheets

IMAGE PROCESSING SYSTEM AND METHOD FOR REMOVING DESIGNATED COLOR IN AN ORIGINAL DOCUMENT

FIELD

Embodiments described herein relate to an image processing system, an image processing method and a recording medium.

BACKGROUND

In a case in which a document is read of which a special note is added with a mark using a color pen, it is required that the document is read with the added marks removed. An image processing apparatus is proposed which has a color dropout function, that is, the image processing apparatus reads a document after removing the part with a specific color contained in such a document. In this kind of image processing apparatus, for example, a two-dimensional color plane is displayed on an operation screen for the user to designate an area corresponding to a color desired to be removed (removal color) on the color plane.

However, in the use of the image processing apparatus, it is afraid that it takes a user having little knowledge relating to the color plane a lot time to set the removal color. Moreover, in a case of wanting to obtain image data of a document from which a comment originally added in the document using a color pen is removed, the user needs to adequately understand a position relationship between a position corresponding to the color of the ink of the color pen which is presented on the color plane and an area corresponding to the removal color on the color plane. If the position relationship on the color plane is not understood thoroughly and the position corresponding to the color of the ink of the color pen is deviated from the area corresponding to the removal color, it is afraid in the obtained image data of the document that the comment may not be removed as wished by the user. To remove a comment as wished by the user, the following series of operations needs to be carried out repeatedly: changing the setting on an area corresponding to the removal color on the color plane, and confirming the image data obtained by reading the document again, thus, it is time-consuming to set the removal color worriedly.

DETAILED DESCRIPTION

An image forming apparatus according to an embodiment comprises a scanner; an extraction section configured to extract color information indicating a color to be removed based on the image data which is obtained by reading, using the scanner, a color information extraction sheet on which an image is formed with a material of the color to be removed; a designation section configured to designate a color presented in an original document as the object to be removed; and a conversion section configured to form, based on the designation of the designation section and the color information extracted by the extraction section, an image by removing the image data in the color designated to be removed from the image data of the original document.

The embodiment according to the present invention is described in detail below with reference to accompanying drawings. In the present embodiment, an image processing apparatus extracts color information indicating a removal color from image data corresponding to a removal color specific area for specifying a removal color in a template print sheet (removal color specific sheet) on which a template is printed. The user only fills in the removal color specific area of the template print sheet with character strings using a color pen to set the color of the color pen in the image processing apparatus as a removal color. The image processing apparatus carries out a color dropout processing corresponding to the removal color represented by the extracted color information for a fed color original document to generate the image data of the color original document from which the removal color is removed.

Figure 1:
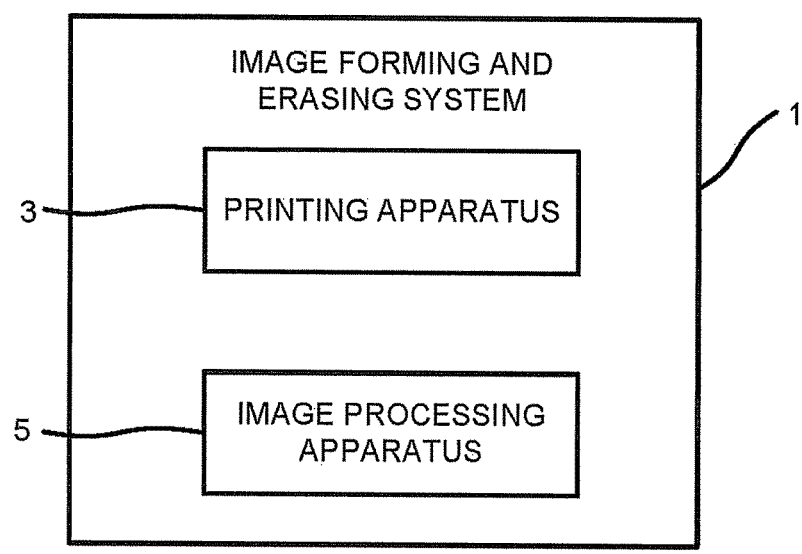
FIG. 1 is a diagram illustrating the structure of an image forming and erasing system according to an embodiment.

As shown in FIG. 1, an image processing system 1 comprises a printing apparatus 3 and an image processing apparatus 5. The printing apparatus 3 prints a template on a sheet with the use of an erasable toner, wherein the template is used to designate a removal color. The image processing apparatus 5 operates in at least two operation modes, including: a template reading mode for extracting color information such as a character string filled in the removal color specific area of the template print sheet with a color pen, and a comment removal mode for generating the image data of a document from which a comment in the extracted removal color originally recorded in the document is removed.

Figure 2:
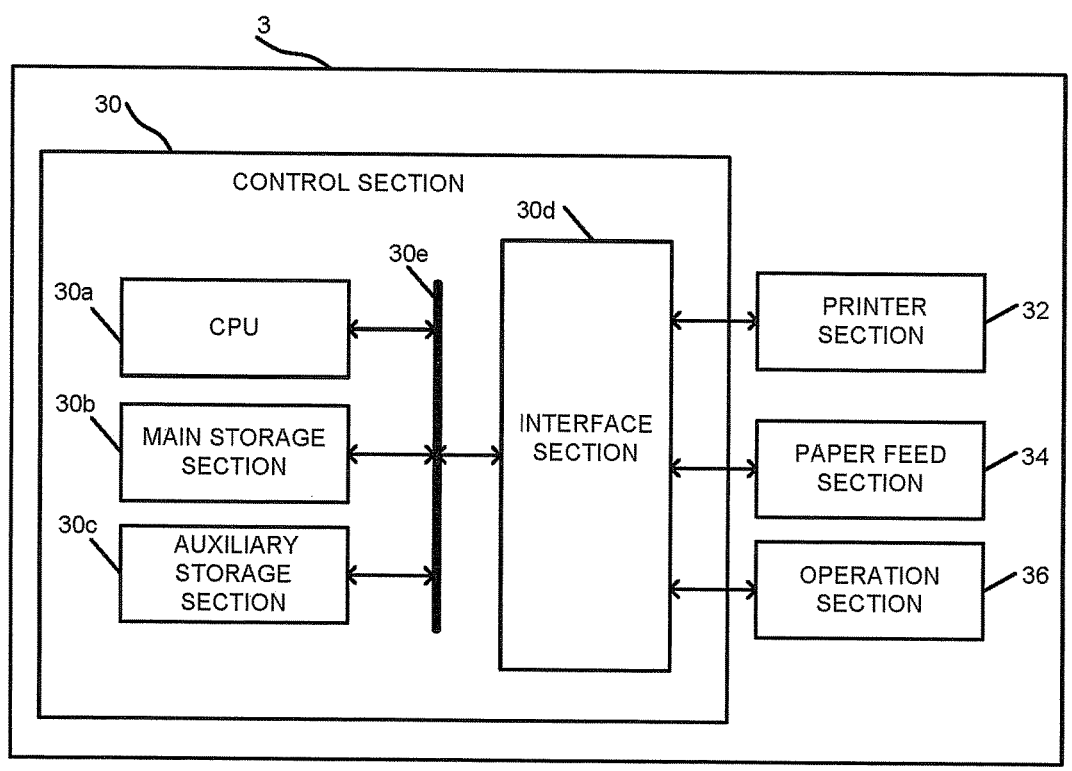
FIG. 2 is a block diagram illustrating the hardware structure of a printing apparatus.

As shown in FIG. 2, the printing apparatus 3 comprises a control section 30, a printer section 32, a sheet feed section 34 and an operation section 36. The control section 30 comprises a CPU (Central Processing Unit) 30a, a main storage section 30b, an auxiliary storage section 30c, an interface section 30d and a system bus 30e for connecting each section. The CPU 30a reads and executes the programs stored in the auxiliary storage section 30c to collectively control the printing apparatus 3.

The main storage section 30b equipped with a volatile memory such as a RAM (Random Access Memory) functions as a working area of the CPU 30a.

The auxiliary storage section 30c is provided with a nonvolatile memory such as a ROM (Read Only Memory), a magnetic disk and a semiconductor memory. The auxiliary storage section 30c stores the programs executed by the CPU 30a and various parameters. The auxiliary storage section 30c also stores the processing results of the CPU 30a sequentially. Further, the auxiliary storage section 30c pre-stores a template image TG used for making a template print sheet for setting a removal color.

The interface section 30d comprises an LAN interface, a serial interface, a parallel interface, an analog interface and the like.

The printer section 32 is provided with a transfer mechanism for transferring an erasable toner onto a sheet.

The sheet feed section 34 feeds a sheet placed on a feeder (not shown) to the printer section 32.

The operation section 36, if receiving an operation from the user, comprises an input device (not shown) for inputting instruction information corresponding to the received operation content to the control section 30 and an output device for outputting the information input from the control section 30. The input device consists of a touch panel, a keyboard or a personal computer connected with the interface section 30d via a network (not shown). The output device consists of a display device such as a display.

Figure 3:
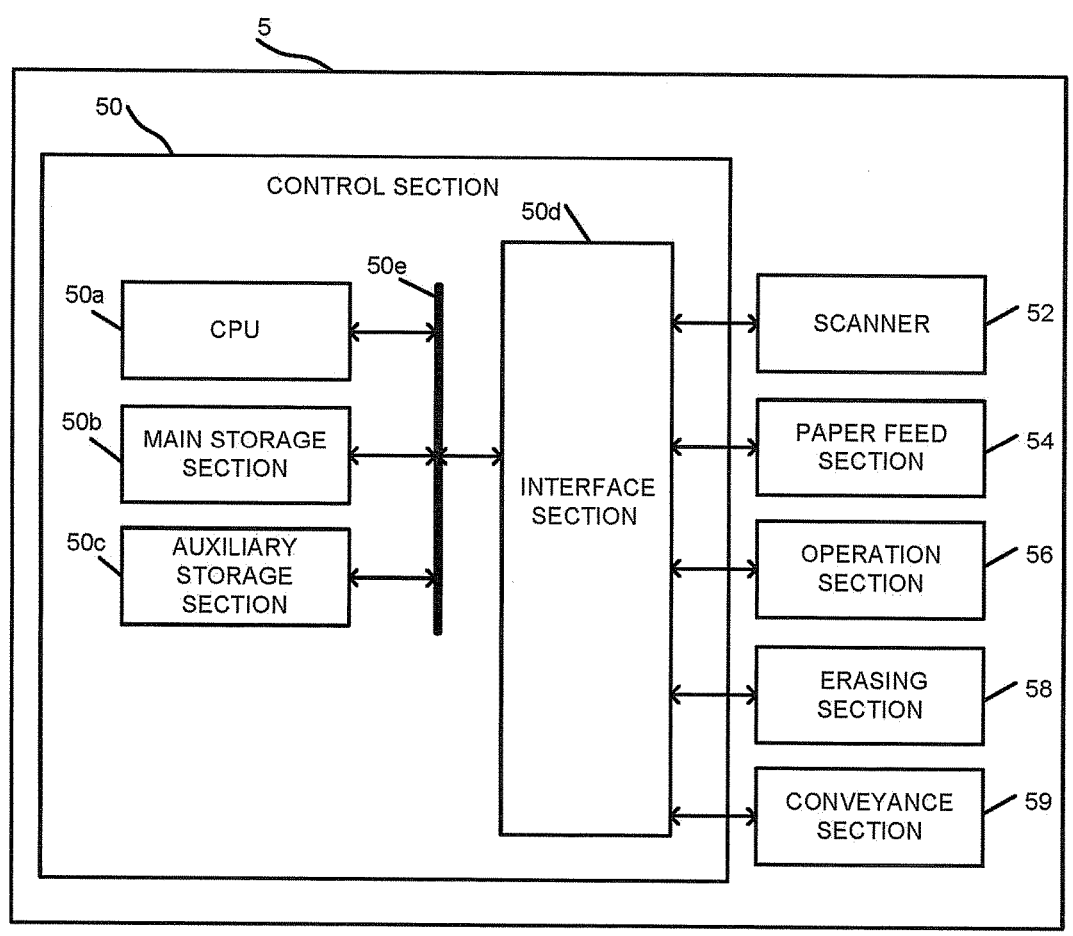
FIG. 3 is a block diagram illustrating the hardware structure of an image processing apparatus.

As shown in FIG. 3, the image processing apparatus 5 comprises a control section 50, a scanner section 52, a sheet feed section 54, an operation section 56, an erasing section 58 and a conveyance section 59. Like the control section 30 of the printing apparatus 3, the control section 50 comprises a CPU 50a, a main storage section 50b, an auxiliary storage section 50c, an interface section 50d and a system bus 50e for connecting each section. The CPU 50a executes the programs stored in the auxiliary storage section 50c by using the main storage section 50b as a working area, thereby collectively controlling the image processing apparatus 5.

The main storage section 50b has an image storage area 521 which temporarily stores the image data of an image read by the scanner 52. The auxiliary storage section 50c has a color information storage area 531 for storing the color information of a designated removal color and an image storage area 532 for storing the image data of which the color is removed. Further, the auxiliary storage section 50c stores a conversion coefficient for setting a LUT (Look Up Table) value of a three-dimensional LUT used in an RGB-to-monochrome conversion processing, information indicating a grid division number of each of R axis, G axis and B axis of the three-dimensional LUT, information indicating a hue region division number in a color plane and information indicating a hue division threshold in a color plane. Further, the auxiliary storage section 50c stores the parameters used by a clustering method executed during a color information extraction processing.

The scanner 52 consists of RGB line sensors which read color signals.

The sheet feed section 54 feeds a sheet placed on a feeder (not shown) to the scanner 52.

Like the operation section 36 of the printing apparatus 3, the operation section 56, if receiving an operation from the user, comprises an input device (not shown) for inputting instruction information corresponding to the received operation content to the control section 50 and an output device for outputting the information input from the control section 50.

The erasing section 58 carries out a heating processing on a sheet on which a template is printed to remove the template printed on the sheet.

In a case in which the scanner 52 reads a template print sheet, the conveyance section 59 conveys the template print sheet for which the reading of the scanner 52 is terminated to the erasing section 58.

Figure 4:
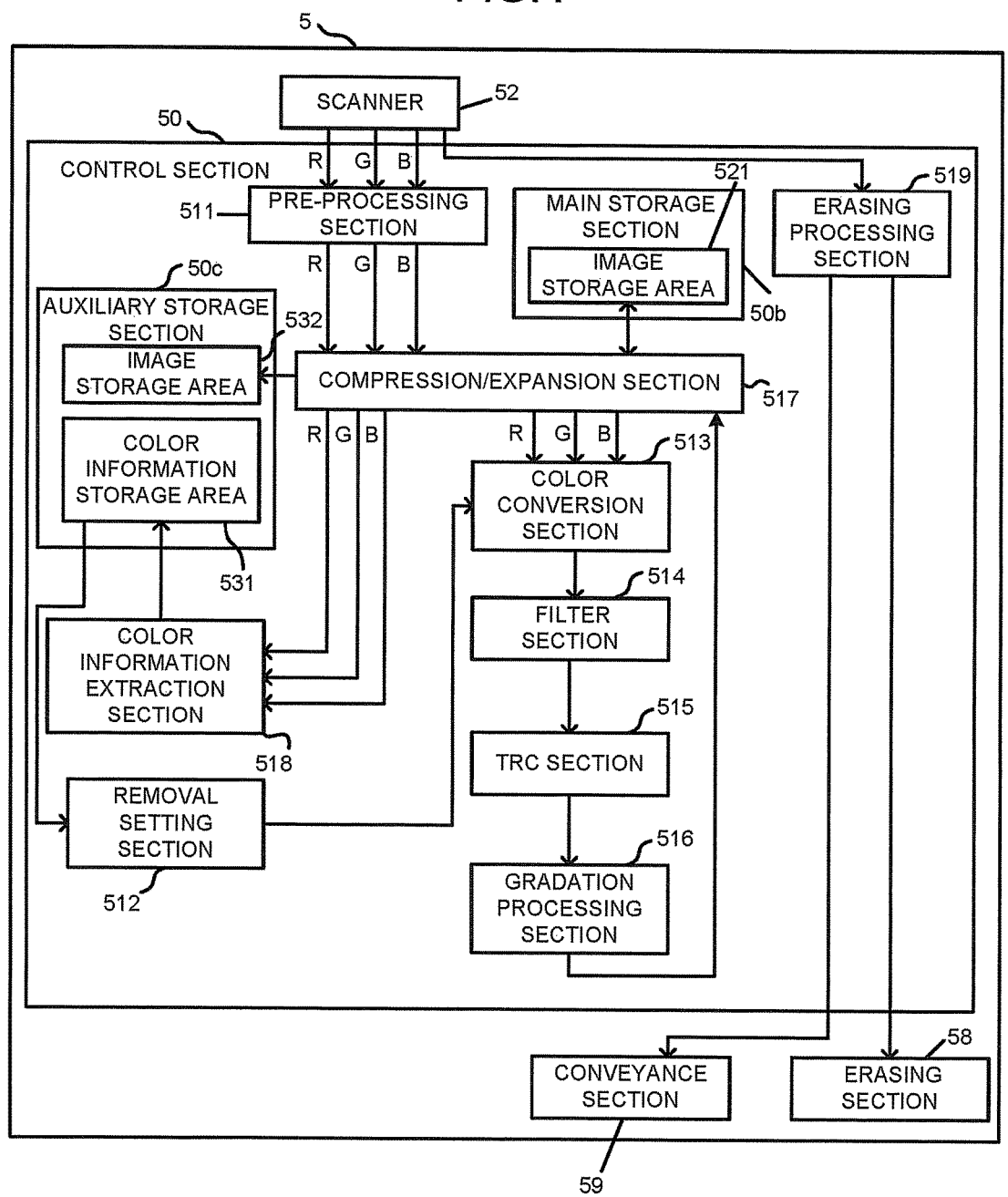
FIG. 4 is a block diagram illustrating the functional structure of the image processing apparatus.

Sequentially, the functional structure of the control section 50 is described. A plurality of types of functional sections shown in FIG. 4 is realized by the control section 50. A pre-processing section 511 carries out an A/D (Analog to Digital) conversion for a R (red) signal, a G (green) signal and a B (blue) signal input from the scanner 52 and then carries out a correction processing. The correction processing includes a shading correction of correcting dispersion of brightness, an inter-line correction of correcting a reading position caused by the line misalignment among an R line sensor, a G line sensor and a B line sensor and a LOG conversion of correcting brightness in consideration of the perception characteristics of human beings.

A removal setting section 512 sets the grid division number and the hue area of the three-dimensional LUT. The removal setting section 512 acquires the grid division number and the hue area number from the auxiliary storage section 50c.

A color conversion section 513 carries out a color dropout processing for the removal color. The 'color dropout' refers to removing a specific color component which is designated as a removal color. The color conversion section 513 calculates, for each grid point of the three-dimensional LUT, a hue angle on the color plane specified by the color difference of the R signal, the G signal and the B signal. Further, the color conversion section 513 sets the LUT value of the three-dimensional LUT based on the information indicating the hue area of the removal color input from the removal setting section 512, the hue angle on the color plane concerning each grid point of the three-dimensional LUT and the conversion coefficient stored in the auxiliary storage section 50c. Then, the color conversion section 513 converts the RGB color signals output from the pre-processing section 511 into monochrome signals with reference to the three-dimensional LUT.

A filter section 514 filters the digital data input from the color conversion section 513 using a FIR (Finite Impulse Response) filter, thereby correcting a contrast. A TRC (Tone Reproduction Correction) section 515 carries out a density adjustment and a gamma correction. A gradation processing section 516 carries out an error diffusion processing and the like.

A compression/expansion section 517 generates, based on the RGB color signals input from the pre-processing section 511 or the monochrome signals input from the gradation processing section 516, compression image data of the image read by the scanner 52 and stores the generated compression image data in the image storage area 521 or the image storage area 532. Further, the compression/expansion section 517 outputs the image data obtained by decoding the compression image data stored in the image storage area 521 to a color information extraction section 518.

If a reading completion signal indicating the completion of the reading of the template print sheet is input from the scanner 52, then an erasing processing section 519 outputs a conveyance instruction signal of instructing the conveyance of the template print sheet to the erasing section 58 to the conveyance section 59. If the conveyance instruction signal is input, the conveyance section 59 conveys the template print sheet to the erasing section 58. Further, if a conveyance completion signal is input from the conveyance section 59 to notify the completion of the conveyance towards the erasing section 58, then the erasing processing section 519 outputs a toner erasing processing instruction signal instructing the execution of a toner erasing processing to the erasing section 58. If the toner erasing instruction signal is input, then the erasing section 58 carries out a toner erasing processing.

Figure 5:
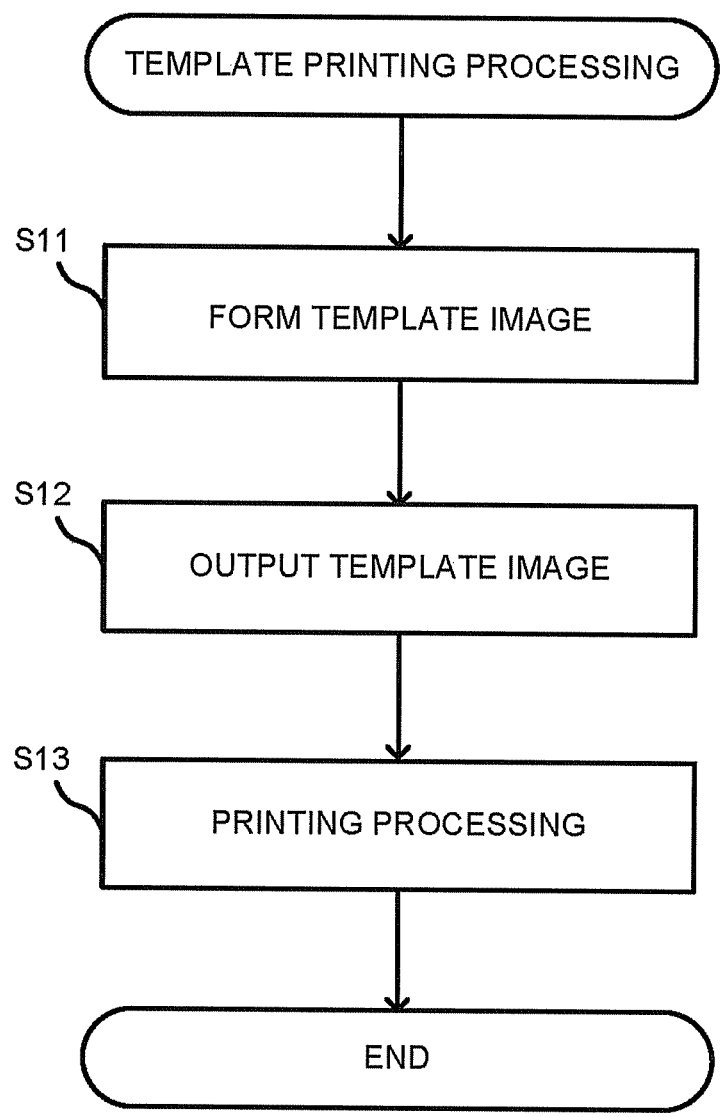
FIG. 5 is a flowchart illustrating a template printing processing.

Sequentially, a template printing processing which is carried out by the printing apparatus 3 to print a template for setting a removal color on a sheet is described with reference to FIG. 5. The start of the template printing processing is triggered through an operation of the user on the operation section 36 of the printing apparatus 3, thereby outputting a template printing instruction signal instructing the printing of the template on the sheet to the control section 30.

First, the control section 30 forms a template image (Act S11). The control section 30 forms the template image based on the template image data TG stored in the auxiliary storage section 30c.

Next, the control section 30 outputs the formed template image to the printer section 32 (Act S12). The template image contains, for example, the content shown in FIG. 6 which specifies a method for making a color original document by filling in the removal color on a sheet for the user.

Then, the control section 30 controls the printer section 32 to print the template image (Act S13). Herein, the printer section 32 prints the template image on a sheet fed from the sheet feed section 34 with an erasable toner, thereby generating a template print sheet. The toner can be erased through an erasing processing executed by the erasing section 58 of the image processing apparatus 5. To make the trace of the erased color unnoticeable, it is preferred that the print density is set to be as low as possible to be in a visible range by people. In this way, a sheet, printed by the printer section 32 with a method of filling in the removal color, is generated which includes a removal color specific area for the writing of the removal color.

Figure 6:
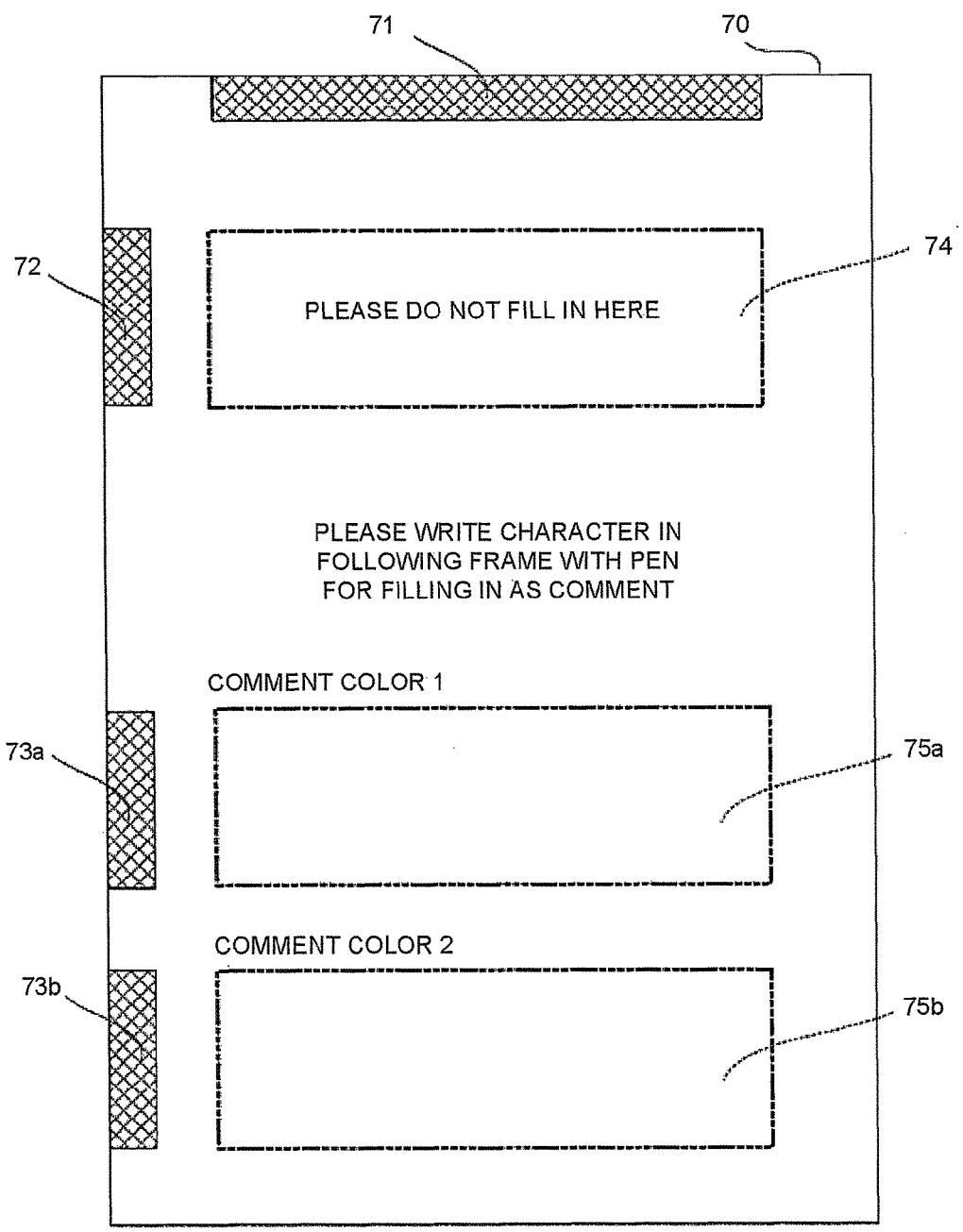
FIG. 6 is a diagram exemplifying a template print sheet.

The template print sheet has, for example, the structure shown in FIG. 6. A template print sheet 70 is made using a sheet, for example, an A4-sized sheet, the plane view of which is rectangular. In the template print sheet 70, a flag 71 is printed on the upper end of a removal color specific area 74 in the projection area towards the longitudinal direction of the template print sheet 70, and a flag 72 is printed on the left end of the removal color specific area 74 in the projection area towards the lateral direction of the template print sheet 70. Herein, the scanner 52 reads the template print sheet 70 with horizontal scanning direction thereof consistent with the lateral direction of the template print sheet 70 and vertical scanning direction thereof consistent with the longitudinal direction of the template print sheet 70. A character string such as 'do not fill in here please' is printed in the removal color specific area 74. In the template print sheet 70, a flag 73a is printed on the left end of a removal color specific area 75a in the projection area towards the lateral direction of the template print sheet 70, and a flag 73b is printed on the left end of a removal color specific area 75b in the projection area towards the lateral direction of the template print sheet 70. In the template print sheet 70, the flag 71 is positioned on the upper end of the removal color specific areas 75a and 75b in the projection area towards the longitudinal direction of the template print sheet 70. The removal color specific areas 75a and 75b are blank columns. The image processing apparatus 5 determines the color of the toner used in the printing apparatus 3 according to the color of the character string printed in the removal color specific area 74. Further, the image processing apparatus 5 specifies the color the user desires to remove according to the colors of the character springs written in the removal color specific areas 75a and 75b. The user can write any character springs respectively in the removal color specific areas 75a and 75b with a color pen. If the character springs of different colors are separately written in the areas 75a and 75b, two kinds of removal colors can be selected.

Figure 7:
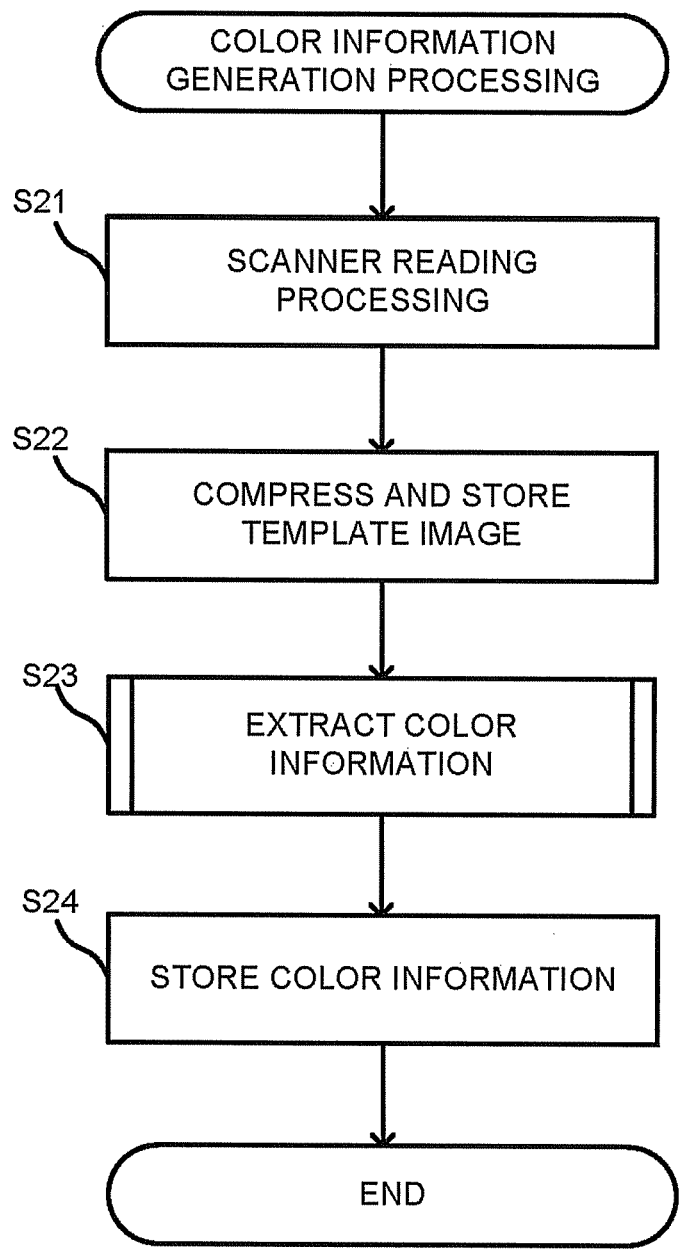
FIG. 7 is a flowchart illustrating a color information generation processing.

A color information generation processing is described with reference to FIG. 7 which is carried out by the image processing apparatus 5 to generate color information according to the image data of the removal color specific areas 74, 75a and 75b included in the template print sheet. Herein, the writing of the character springs into the removal color specific areas 75a and 75b included in the template print sheet by the user is described. The start of the color information generation processing is triggered through an operation of the user on the operation section 56 of the image processing apparatus 5, thereby outputting a template reading mode instruction signal for instructing the image processing apparatus 5 to operate with a template reading mode to the control section 30. In a state in which a screen is displayed on, for example, the operation section 56 for the user to select an operation mode of the image processing apparatus 5, if the user touches the button on the screen which is corresponding to the template reading mode, then the template reading mode instruction signal is output to the control section 30.

First, the pre-processing section 511 enables the scanner 52 to carry out a scanner reading processing of reading a template print sheet placed on the reading section of the scanner 52 (Act S21). If completing the scanner reading processing, the scanner 52 outputs a reading completion notification signal to the erasing processing section 519. As to the placing method of the template print sheet on the reading section of the scanner 52, the user may directly place the template print sheet on the reading section, or the template print sheet placed on a feeder is fed from the feeder to the reading section of the scanner 52. Herein, the pre-processing section 511 converts the analog R signal, G signal and B signal input from the scanner 52 into digital signals and then executes the foregoing correction processing.

If the reading completion notification signal is input from the scanner 52, then the erasing processing section 519 outputs a conveyance instruction signal of instructing the conveyance of the template print sheet to the erasing section 58 to the conveyance section 59. In the erasing section 58, the toner transferred on the template print sheet 70 is thermally processed to be invisible.

Sequentially, the compression/expansion section 517 generates compression image data of the image read by the scanner 52 according to a digital signal corrected by the pre-processing section 511 and then stores the compression image data in the image storage area 521 (Act 22).

Next, the color information extraction section 518 extracts, from the image data decoded by the compression/expansion section 517, color information indicating the colors of the character strings respectively recorded in the areas 74, 75a and 75b of the template print sheet (Act S23). The color information extraction section 518 specifies areas of overlapping the projection areas of the flags 72, 73a and 73b respectively towards the horizontal scanning direction and the projection area of the flag 71 towards the vertical scanning direction in the decoded image data of the template print sheet 70 separately as removal color specific areas 74, 75a and 75b. The color information extraction section 518 extracts color information indicating a color difference respectively corresponding to each of the removal color specific areas 74, 75a and 75b. The color information is composed of the following three color differences, that is, a color difference $I(R)-I(G)$ of the level $I(R)$ of the R signal and the level I(G) of the G signal, a color difference I(G)−I(B) of the level I(G) of the G signal and the level I(B) of the B signal and a color difference I(B)−I(R) of the level I(B) of the B signal and the level I(R) of the R signal. The detail of the color information extraction processing is described later.

Then, the color information extraction section 518 stores the extracted color information in the color information storage area 531 (Act S24). In this manner, the color information extraction section 518 extracts, from the image data read by the scanner, color information which represents a removal color written using the method instructed by the template print sheet generated by the printer section 32.

Figure 8:
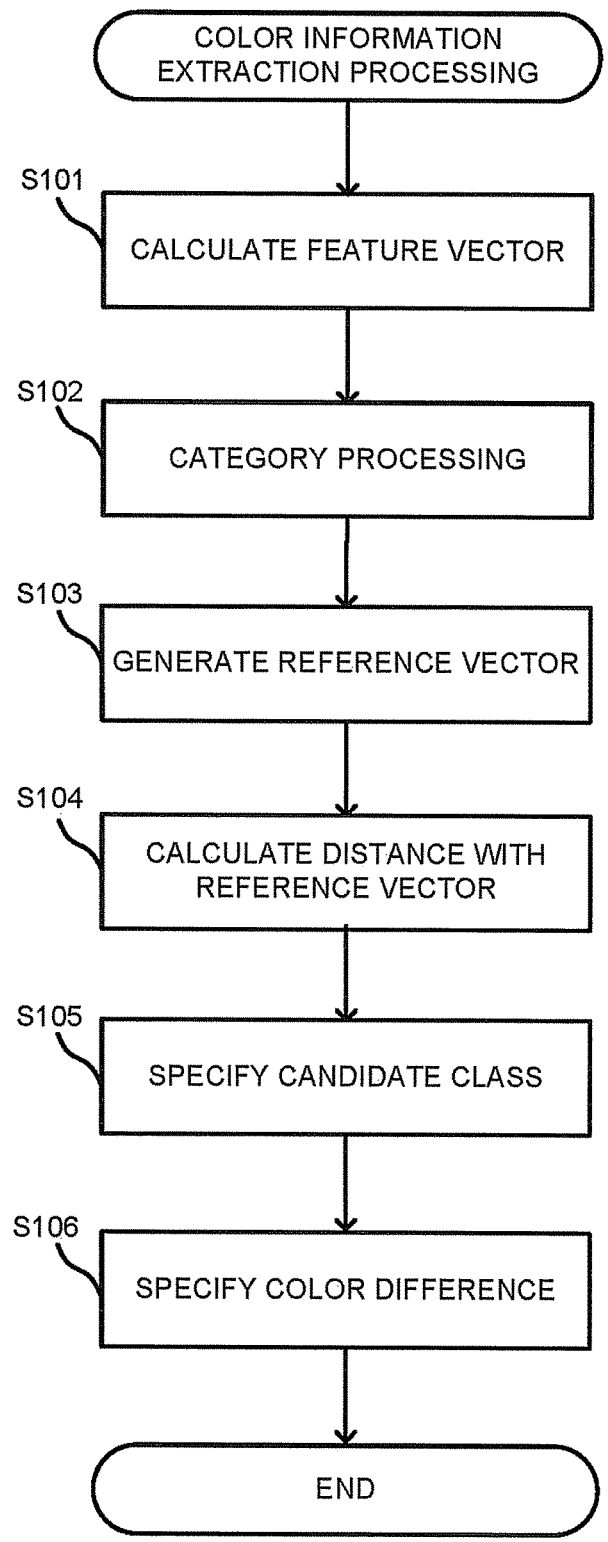
FIG. 8 is a flowchart illustrating a color information extraction processing.

Next, the color information extraction processing is described below in detail with reference to FIG. 8. First, the color information extraction section 518 calculates, for all the image pixels constituting the image data corresponding to the removal color specific areas 74, 75a and 75b, a three-dimensional feature vector the elements of which include the three color differences (Act S101).

Then, the color information extraction section 518 acquires the parameters using a clustering method from the auxiliary storage section 50c and carries out a classification processing of classifying the feature vectors corresponding to all the image pixels into a plurality of classes using the clustering method (Act S102). The clustering method may be, for example, Ward method or K-means clustering.

Sequentially, the color information extraction section 518 generates, based on the color difference information with respect to the color of the ground of the template print sheet 70, a reference vector serving as a feature vector the elements of which include the three color differences corresponding to the color of the ground (Act S103). The color difference information with respect to the color of the ground of the template print sheet 70 is extracted from, for example, the image data of the other area of the template print sheet 70 which excludes the removal color specific areas 74, 75a and 75b and in which no characters are printed.

Then, the color information extraction section 518 calculates the distance between the reference vector and the center-of-gravity vector (centroid) of feature vectors respectively belonging to the plurality of classes (Act 104).

Next, the color information extraction section 518 specifies a candidate class serving as a candidate of a class to which the feature vector corresponding to the removal color belongs based on the distance between the reference vector and the center-of-gravity vector of feature vectors respectively belonging to the plurality of classes (Act S105). Herein, the color information extraction section 518 specifies the class to which the reference vector belongs, based on the distance between the reference vector and center-of-gravity vector of each class and specifies the other classes to which the reference vector does not belong in the candidate classes.

Then, the color information extraction section 518 specifies the class to which feature vectors most belong from the candidate classes and specifies each element of the center-of-gravity vector of the feature vector belonging to the specified class as a color difference corresponding to the removal color (Act S106).

In this way, the color information extraction section 518 extracts the color difference, that is, the color information, corresponding to the removal color using the clustering method. Thus, by selecting a proper clustering method, a removal color can be specified high-precisely or specified within a shorter time.

Figure 9:
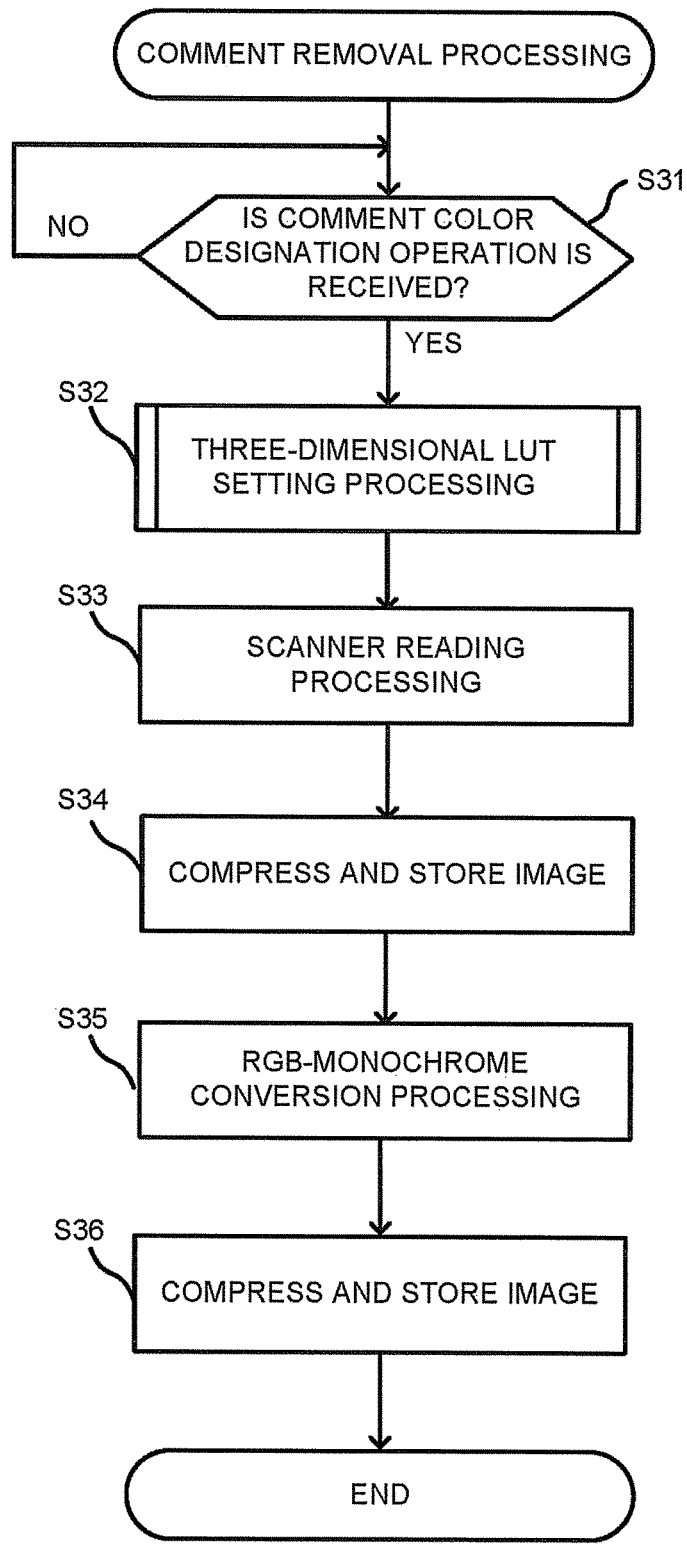
FIG. 9 is a flowchart illustrating a comment removal processing.

Next, a comment removal processing is described with reference to FIG. 9, which is executed by the image processing apparatus 5 to generate the image data of a color original document from which a comment originally added in the document is removed. It is described here that a color original document is printed by printing apparatus 3 and a comment is added in the color original document with a color pen of a removal color. The start of the comment removal processing is triggered by an operation of the user on the operation section 56 of the image processing apparatus 5, thereby outputting a comment removal mode instruction signal of instructing the operation of the image processing apparatus 5 with a comment removal mode to the control section 50. In a state in which a screen is displayed on, for example, the operation section 56 for the user to select the operation mode of the image processing apparatus 5, if the user touches the button on the screen which is corresponding to the comment removal mode, then, the comment removal mode instruction signal is output to the control section 50.

First, the removal setting section 512 determines whether or not a comment color designation operation for designating the color of a comment added in a color original document is received (Act S31). If no comment color designation operation is received (Act S31: No), the removal setting section 512 remains on standby.

Figure 10:
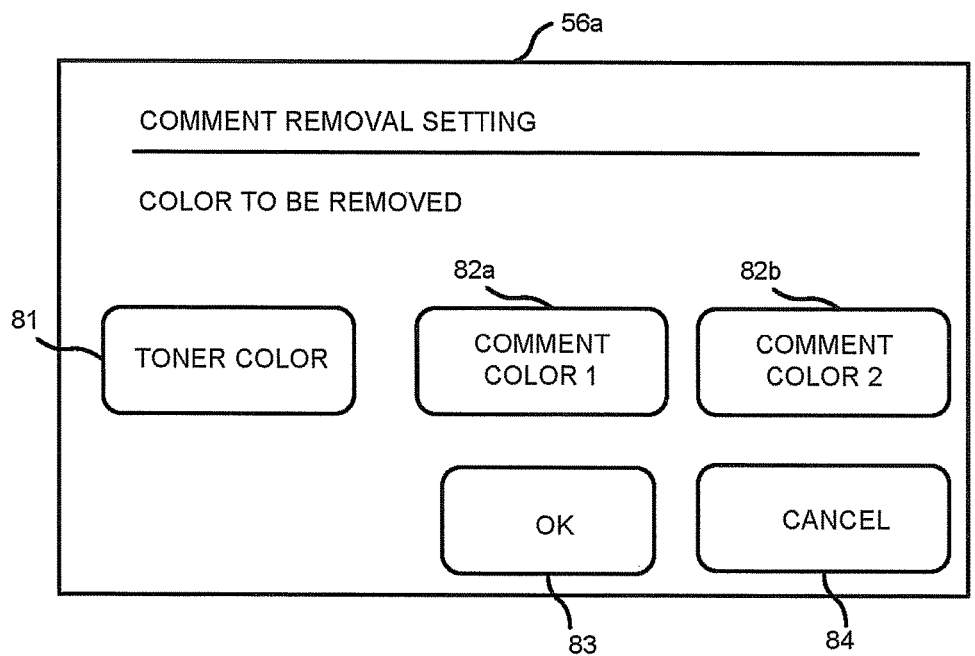
FIG. 10 is a diagram exemplifying an operation screen.

The removal setting section 512 displays the comment color designation screen 56a shown in FIG. 10 on the operation section 56. The following images are displayed on the comment color designation screen 56a: three color selection buttons 81, 82a and 82b for selecting a color to be removed; a determination button 83 touched at the time of determining the setting of the removal color and a releasing button 84 for releasing the color selection buttons 81, 82a and 82b from a selected state. The color selection button 81 is a button for selecting the color of a toner as a removal color, and the color selection buttons 82a and 82b are buttons for the user to select the colors of the character strings written in the removal color specific areas 75a and 75b of the template print sheet 70 as removal colors. The color selection buttons 81, 82a and 82b are displayed in the same color at the initial state, and if the user touches anyone of the color selection buttons 81, 82a and 82b, the touched color selection button is changed into a color different from the initial color to indicate the selection on the touched color selection button. In this state, if the determination button 83 is touched, then the color corresponding to the selected color selection button is determined as a removal color. On the other hand, if the user touches the releasing button 84 in a state of selecting anyone of the color selection buttons 81, 82a and 82b, then the selection on the color selection button is released, and all the colors of the color selection buttons 81, 82a and 82b are changed back to the initial color. If the user touches the determination button 83 after selecting anyone of the color selection buttons 81, 82a and 82b, the removal setting section 512 determines that a comment color designation operation is received.

If either of the color selection buttons 82a and 82b is selected and determined, then only the part of the color original document printed with a toner is left as image data. On the other hand, if the color selection button 81 is selected and determined, then only the part of the color original document added with a comment is left as image data.

Returning to FIG. 9, in Act S31, if it is determined that a comment color registration operation is received (Act S31: Yes), then the removal setting section 512 and the color conversion section 513 carry out a three-dimensional LUT setting processing to set a three-dimensional LUT used in an RGB-to-monochrome conversion processing (Act S32). The three-dimensional LUT is separately set according to the specified removal color. The detail of the three-dimensional LUT calculation procession is described later.

Then, the pre-processing section 511 enables the scanner 52 to carry out a scanner reading processing of reading a color original document added with a comment (Act S33).

Sequentially, the compression/expansion section 517 generates compression image data of the image read by the scanner 52 according to a digital signal corrected by the pre-processing section 511 and then stores the compression image data in the image storage area 521 (Act S34).

Then, the color conversion section 513 carries out an RGB-to-monochrome conversion processing for the image data of the color original document decoded by the compression/expansion section 517 (Act S35). Herein, the color conversion section 513 carries out the RGB-to-monochrome conversion processing using the three-dimensional LUT the LUT value of which is set through the three-dimensional LUT setting processing. Herein, according to the LUT values of the eight grid points constituting a unit cubic grid of the three-dimensional LUT containing the image data, the color conversion section 513 carries out an interpolation and calculation processing for the image data not corresponding to the grid points of the three-dimensional LUT. In this way, the image data of a color original document is generated from which the comment is deleted. Further, the filter section 514, the TRC section 515 and the gradation processing section 516 carry out the foregoing correction processing for the image data subjected to the color dropout processing carried out by the color conversion section 513.

At last, the compression/expansion section 517 compresses the image data for which the color conversion section 513 carries out a color dropout processing and the filter section 514, the TRC section 515 and the gradation processing section 516 carry out a correction processing and stores the compression image data in the image storage area 532 (Act S36).

Figure 11:
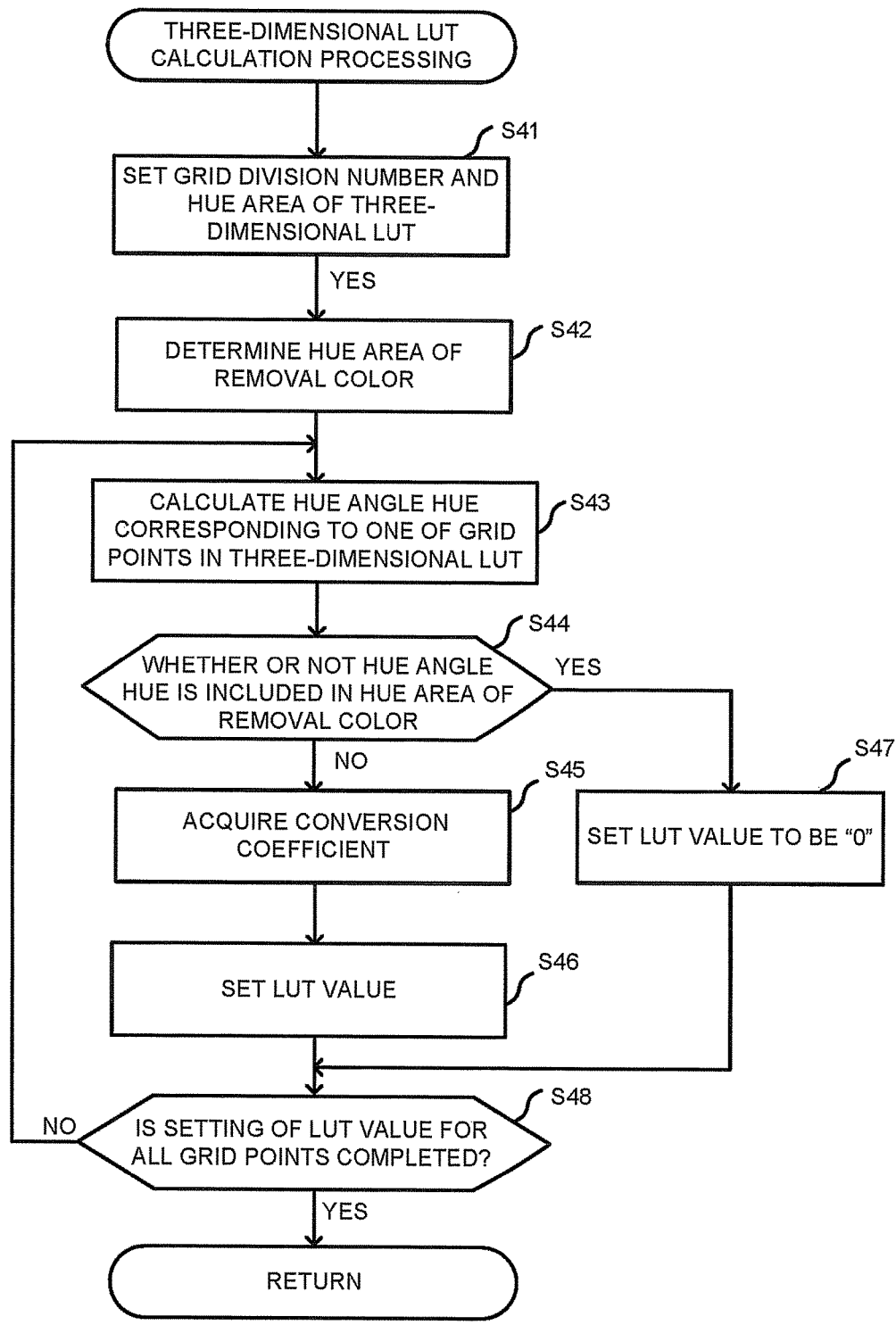
FIG. 11 is a flowchart illustrating a three-dimensional LUT setting processing.
Figure 12:
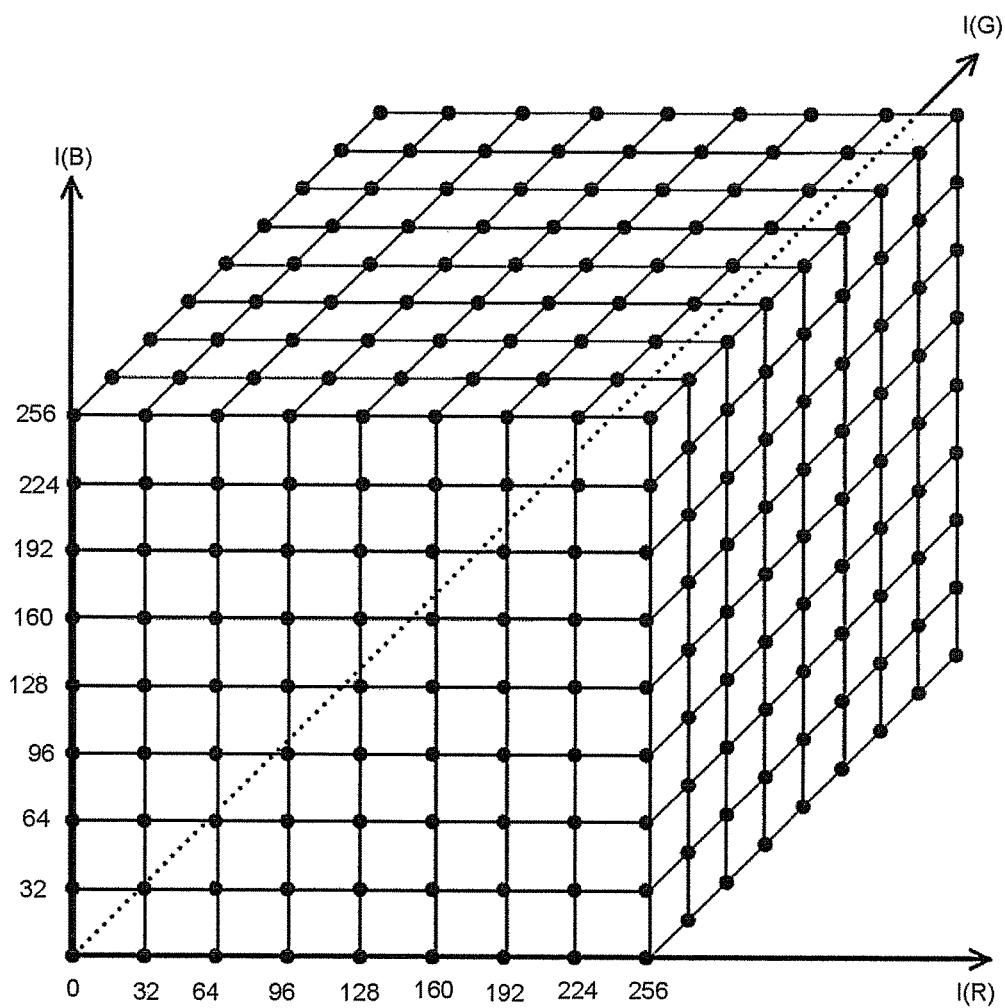
FIG. 12 is a diagram illustrating a three-dimensional LUT.

Next, the three-dimensional LUT calculation processing is described in detail below with reference to FIG. 11 to FIG. 13.

First, the removal setting section 512 sets the grid division number and the hue area of the three-dimensional LUT (Act S41). Herein, the removal setting section 512 acquires the grid division number, the hue region division number and the hue division threshold of the R axis, the G axis and the B axis of the three-dimensional LUT stored in the auxiliary storage section 50c. The three-dimensional LUT is defined as a table which correlates the three-dimensional coordinate in a three-dimensional pixel value space with an LUT value. FIG. 12 is a diagram illustrating a three-dimensional color space coordinate correlated with each LUT value in a three-dimensional LUT. In the three-dimensional LUT, as shown in FIG. 12, the levels I(R), I(G) and I(B) of the R signal, the G signal and the B signal are respectively represented by eight bits (256 gradations), and the grid division number of each of the levels I(R), I(G) and I(B) is set to be 9 (32 gradations). In this way, an LUT value is set for each of the 729 (9*9*9=729) grid points (with reference to black dots shown in FIG. 12).

Figure 13:
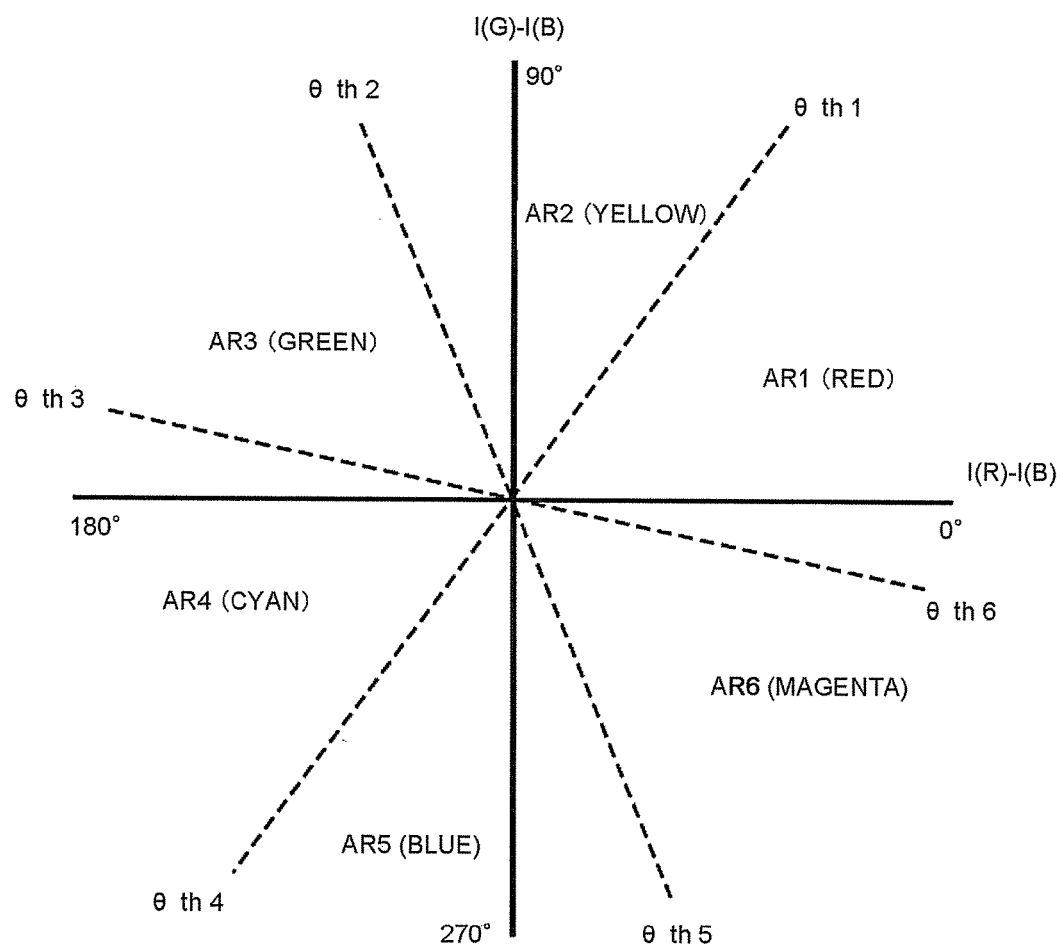
FIG. 13 is diagram illustrating a color plane.

As shown in FIG. 13, the removal setting section 512 defines a color plane as a plurality of (6, in FIG. 13) hue areas. In FIG. 13, the color plane defines the difference I(R)–I(G) of the level I(R) of the R signal and the level I(G) of the G signal as the X axis and the difference I(G)–I(B) of the level I(G) of the G signal and the level I(B) of the B signal as the Y axis. Then, the angle formed with the x axis is defined as a hue angle. In the example shown in FIG. 13, the color plane is divided into six hue areas AR 1 (red area), AR2 (yellow area), AR3 (green area), AR4 (cyan area), AR5 (blue area) and AR6 (magenta area) by hue division thresholds θth1, θth2, θth3, θth4, θth5 and θth6

Returning to FIG. 11, the removal setting section 512 acquires color information from the color information storage area 531 and determines the hue area of the removal color based on a hue angle corresponding to the acquired color information (Act S42). For example, if the hue angle corresponding to the color information is included in the hue area AR1 (red area), the hue area of the removal color is determined to be included in the area AR1. Further, in a case in which there are two kinds of color information, for example, if the hue angle corresponding to the color information is included in the hue area AR1 (red area) and the hue area AR5 (blue area), then the hue area of the removal color is determined to be included in the areas AR1 and AR2.

Then, the color conversion section 513 calculates a hue angle Hue corresponding to anyone of the grid points in the three-dimensional LUT (Act S43). Specifically, the color conversion section 513 calculates a hue angle Hue corresponding to each of the grid points in the three-dimensional LUT according to the following relational expression (1): (number 1)

$$\text{Hue} = \tan^{-1}\left(\left(\frac{I(G) - I(B)}{I(R) - I(B)}\right) \cdot \frac{180}{\pi}\right). \qquad \text{(formula 1)}$$

Sequentially, the color conversion section 513 determines whether or not the calculated hue angle Hue is included in the hue area of the removal color on the color plane (Act S44).

In Act S44, if the calculated hue angle Hue is not included in the hue area of the removal color (Act S44: No), the color conversion section 513 acquires, from the auxiliary storage section 50b, a conversion coefficient corresponding to the hue area where the grid points of the calculated hue angle Hue exist (Act S45). For example, if the hue angle Hue exists in the area AR2 (yellow area), the color conversion section 513 acquires the conversion coefficient corresponding to the area AR2 (yellow area).

Next, the color conversion section 513 sets an LUT value corresponding to the grid points of the calculated hue angle Hue using the acquired conversion coefficient (Act S46). Herein, the color conversion section 513 calculates the LUT value using the conversion coefficient according to the following relational expression (2): (number) (2)

$$LUT = 255 \cdot (a1 \quad a2 \quad a3 \quad a4 \quad a5 \quad a6 \quad a7 \quad a8 \quad a9 \quad a10) \qquad \text{(Formula 2)}$$

$$\begin{pmatrix} I(R)/255 \\ I(G)/255 \\ I(B)/255 \\ (I(R)/255)^2 \\ (I(G)/255)^2 \\ (I(B)/255)^2 \\ (I(R) \cdot I(G)/255)^2 \\ (I(G) \cdot I(B)/255)^2 \\ (I(B) \cdot I(R)/255)^2 \\ 1 \end{pmatrix}$$

Herein, I(R), I(G) and I(B) respectively represent pixel values corresponding to the R signal, the G signal and the B signal. As shown in formula (2), the LUT value is calculated as the inner product of matrix of 1*10 with conversion coefficients from a1 to a10 and matrix with the conversion component of 10*1.

On the other hand, in Act S44, if the calculated hue angle Hue is included in the hue area of the removal color (Act S44: Yes), the color conversion section 513 sets the LUT value to be 0 (Act S47). That is, the color conversion section 513 calculates the LUT value by taking all the conversion coefficients as 0. The setting of the LUT value as 0 means that the specified removal color is 'white'.

Sequentially, the color conversion section 513 determines whether or not the LUT value is set for each of all grid points of the three-dimensional LUT (Act S48). In Act S48, if it is determined that not all the grid points of the three-dimensional LUT are set with the LUT value (Act S48: No), then Acts S43-S47 are executed repeatedly. On the other hand, if it is determined that each of all grid points of the three-dimensional LUT is set with an LUT value (Act S48: Yes), then the three-dimensional LUT processing is ended.

As described above, in accordance with the embodiment of the present invention, the color information extraction section 518 extracts color information indicating a color to be removed based on the image data obtained by reading, using the scanner, a template print sheet on which an image is formed with the material (e.g. the ink of a color pen) of the color to be removed. Then, the removal setting section 512 designates a color to be removed from an original document. On this basis, the color conversion section 513 forms image data in which the image data of the color designated to be removed is not contained. In this way, the user can designate a removal color by an easy method of filling in the template print sheet. Thus, the image forming and erasing system 1 of the present embodiment is more convenient to the user.

Further, in the present embodiment, a printing apparatus is used which carries out a printing processing with a method of writing a removal color in a specific area included in a write sheet as a method for designating the writing of the removal color. Thus, the user can designate a removal color merely by writing a removal color on the template print sheet shown in FIG. 6 and reading the removal color with a scanner. Therefore, even the user having no special knowledge can understand how to designate a removal color.

The color information extraction section 518 extracts color information indicating a removal color from image data corresponding to the removal color specific areas 75a and 75b for specifying the removal color of a template print sheet read by the scanner 52. That is, the user can designate the color desired to be removed only by writing a character string in at least one of the removal color specific areas 75a and 75b of the template print sheet with the use of an ink in the color desired to be removed. In this way, even a user having no knowledge of color plane can designate a removal color, thus, a removal color can be designated easily.

Further, in accordance with the present embodiment, the color information extraction section 518 specifies, for the image data of the template print sheet 70, the area of overlapping the projection areas of the flags 72, 73a and 73b towards the horizontal scanning direction of the scanner 52 and the projection area of the flag 71 towards the vertical scanning direction of the scanner 52 as the removal color specific areas 74, 75a and 75b. In this way, the color information extraction section 518 specifies a removal color specific area accurately, thus inhibiting the occurrence of the error extraction of a removal color.

Further, in accordance with the present embodiment, if character strings of different colors are written in the removal color specific areas 75a and 75b of the template print sheet 70, then the color information extraction section 518 extracts two kinds of color information from the character strings written in the each of removal color specific areas 75a and 75b. Then, the color conversion section 513 carries out a color dropout processing for the removal colors respectively represented by the two kinds of color information from the image data of the color original document read by the scanner 52. In this way, two colors can be removed from the image data and thus the image data of the color original document from which the comments originally recorded with, for example, two colors in the color original document are removed is formed.

Further, in accordance with the present embodiment, the color conversion section 513 sets a plurality of hue areas on a color plane and takes all the colors corresponding to the hue areas in which a hue angle Hue calculated according to the color information is included from the plurality of hue areas as the removal colors to carry out a color dropout processing. In this way, even if there is a dispersion at different levels in the same hue area in the colors of the character strings written in the removal color specific areas 75a and 75b of the template print sheet 70, the color dropout processing can be carried out normally, thus preventing that a part of the comments is not removed to be left in the image data of the color original document originally added with the comments.

Further, in accordance with the present embodiment, the printing apparatus 3 carries out a printing processing using a erasable toner. Further, the image processing apparatus 5 comprises an erasing section 58 which makes the toner transferred on the template print sheet 70 invisible. In this way, the template print sheet 70 can be reused. Further, in the case where the printing apparatus is an inkjet printing apparatus, the template sheet can be printed with an erasable ink for inkjet, and the erasing section carries out a processing to make the ink invisible for the reuse of the sheet.

Although the embodiment of the present invention is described above, the present invention is not limited to the forgoing embodiment. For example, the color information extraction section 518 may also acquire color information according to a part of the image data of a color original document.

Figure 14:
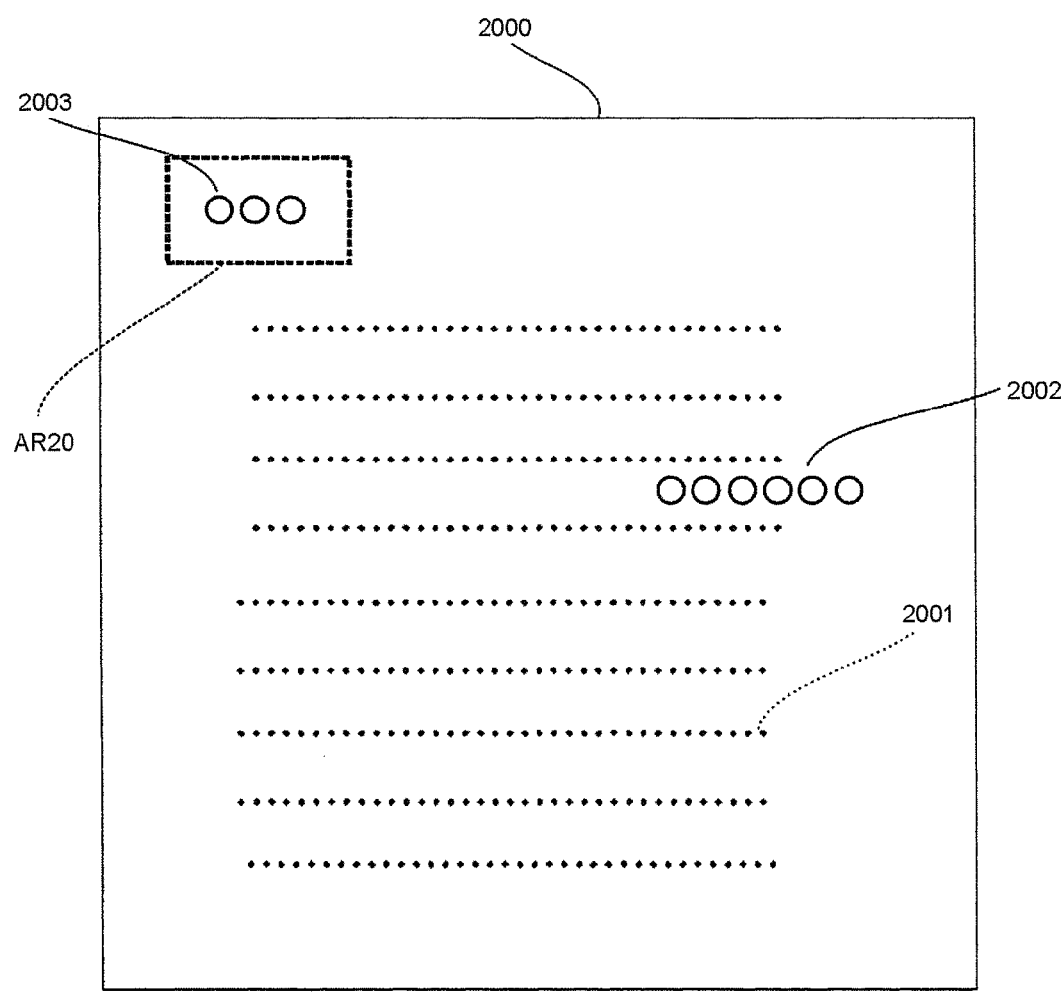
FIG. 14 is a diagram illustrating the operations carried out by a color information extraction section according to a modification.

As shown in FIG. 14, the color information extraction section 518 extracts the color of a character string 2003 existing in an area AR 20 in the image data 2000 of the color original document in which an article 2001 is added with a comment 2002 as color information of a removal color. Thus, the user can remove the comment 2002 by writing, with a color pen for writing the comment 2002, character strings in the part corresponding to the area AR20 in the color original document read by the scanner 52.

No template print sheet is needed in this case.

It is described in the forgoing embodiment that the color conversion section 513 takes the color difference in an RGB space as color information. But not limited to this, the color conversion section 513 may take the color difference in an LAB space as color information.

It is described in the foregoing embodiment that two kinds of removal colors are set. But not limited to this, the removal colors may be three or more colors.

In this way, the color to be removed contains a plurality of colors which may be together designated as the removal colors, thus, the image processing system is more convenient to the user.

It is described in the foregoing embodiment that the grid division number and the hue resign division number of the R axis, the G axis and the B axis of a three-dimensional LUT are stored in the auxiliary storage section 50c in advance. However, not limited to this, the user may operate the operation section 56 to set the grid division number and the hue resign division number optionally.

It is exemplified in the foregoing embodiment that the printing apparatus 3 is separated from the image processing apparatus 5. However, not limited to this, the printing apparatus 3 may be integrated with the image forming apparatus 5.

It is described in the foregoing embodiment that the image processing apparatus 5 stores the image data subjected to a color dropout processing in the image storage area 532 of the auxiliary storage section 50c. Not limited to this, if the image processing apparatus 5 is connected with the printing apparatus or a network, then image data is output to the printing apparatus as it is or sent to another terminal machine via the network.

It is described in the foregoing embodiment that the image processing apparatus 5 is provided with a compression/expansion section 517. But not limited to this, the compression/expansion section 517 may be not arranged in the image processing apparatus 5. In this case, the pre-processing section 511 may directly output an RGB signal to the color information extraction section 518 or color conversion section 513.

It is described in the foregoing embodiment that a method of designating the removal color for user is shown by printing a template on a template print sheet. However, a method of designating the removal color is not limited to this. It is also applicable that the color information extraction section 518 extracts color information of a removal color by scanning a sheet on which a line of the removal color is drawn with a specific thickness (for example, more than 5 millimeters) in a blank. In this case, instead of printing a template on a sheet, an instruction 'how to fill in the removal color' is displayed on the display device of the operation section 36 of the printing apparatus 3 or the display device of the operation section 56 of the image processing apparatus 5.

Further, in the foregoing embodiment, the ink of a color pen is exemplified as the material of color to be removed. Besides, the color to be removed may also be a color presented when a print operation is carried out on a template print sheet with a toner or an ink for an inkjet apparatus.

Further, it is described in the foregoing embodiment that the image based on the image data of the color designated as the removal color in a color dropout processing is not formed. However, not limited to this, it is also effective if the image data of the removal color generates an image lighter than that generated by the image data of the other colors. At this time, the effect is greater if the formed removal color is light enough to be unrecognized by the people.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing system comprising:
   a scanner coupled to a processor that executes instructions to perform operations, comprising:
   controlling output image data of a color information extraction sheet including a specific area;
   extracting color information of a color to be removed corresponding to the specific area, based on image data which is obtained by reading, using the scanner, the color information extraction sheet on which an image is formed with a material of a color to be removed;
   designating a color presented in an original document as the object to be removed; and
   forming, based on the designating and the color information extracted, an image by removing the image data in the color to be removed from the image data of the original document.

2. The image processing system according to claim 1, wherein
   the material of the color to be removed is one of a toner, an ink for writing utensils or an ink for an inkjet apparatus.

3. The image processing system according to claim 1, wherein
   the color to be removed contains a plurality of colors;
   the controlling outputs the image data of the color information extraction sheet including a plurality of the specific area;
   the plurality of the colors to be removed is recognizably formed on the color information extraction sheet respectively;
   the extracting respectively extracts color information, indicating the plurality of the colors to be removed formed on the color information extraction sheet, corresponding to the plurality of the specific area;
   the designating designates one of the plurality of colors as the object to be removed; and
   the forming forms the image by removing the image data in the plurality of the colors to be removed.

4. The image processing system according to claim 1, wherein
   no image is formed by the forming based on the image data of the color designated by the designating as the object to be removed.

5. The image processing system according to claim 1, wherein
   the forming forms the image based on the image data of the color designated by the designating as the object to be removed which is lighter, instead of by removing, than the image based on the image data of the other colors undesignated by the designating as the object to be removed.

6. The image processing system according to claim 1, wherein
   the controlling outputs image data of a color information extraction sheet including the specific area for the user to fill in with a writing utensil for indicating the color to be removed is arranged on the color information extraction sheet.

7. The image processing system according to claim 1, wherein,
   the controlling outputs image data of the color information extraction sheet including at least a first flag and a second flag, wherein the first flag is printed towards a first horizontal scanning direction of the specific area and the second flag is printed towards a second horizontal scanning direction of the specific area; and the extracting determines the specific area, in a case of reading a color original document based on the image data of the image data of the color information extraction, towards the vertical scanning direction of overlapping areas of the horizontal scanning direction of the first flag and of the second flag.

8. The image processing system according to claim 1, further comprising:

a printing apparatus that prints a color information extraction sheet with a toner or an ink for an inkjet apparatus which can be erased by heating; and erasing the content printed by the printing apparatus by heating.

9. An image processing method, comprising:

outputting, by using an image processing apparatus coupled to a processor, output image data of a color information extraction sheet including a specific area;

extracting, using the image processing apparatus, color information of a color to be removed corresponding to the specific area based on image data which is obtained by reading, using a scanner, the color information extraction sheet on which an image is formed with a material of a color to be removed;

designating, using the image processing apparatus, a color presented in an original document as the object to be removed; and forming, using the image processing apparatus, based on the designation and the extracted color information, an image by removing the image data in the color designated to be removed from the image data of the original document.

10. A non-transitory computer-readable recording medium which records programs for enabling a computer which controls a scanner to function as:

an output controller that controls to output image data of a color information extraction sheet including a specific area;

an extractor that extracts color information of a color to be removed corresponding to the specific area, based on image data which is obtained by reading, using a scanner, the color information extraction sheet on which an image is formed with a material of a color to be removed;

a designator that designates a color presented in an original document as the object to be removed; and a converter that forms, based on the designation of the designator and the color information extracted by the extractor, an image by removing the image data in the color designated to be removed from the image data of the original document.

* * * * *